Aug. 8, 1950   Q. A. KERNS   2,517,676
PULSE-FORMING PREAMPLIFIER
Filed April 5, 1948   8 Sheets-Sheet 1

INVENTOR.
QUENTIN A. KERNS
BY
Roland A. Anderson
ATTORNEY

Aug. 8, 1950

Q. A. KERNS 2,517,676

PULSE-FORMING PREAMPLIFIER

Filed April 5, 1948

INVENTOR.
QUENTIN A. KERNS

BY
Roland A. Anderson
ATTORNEY

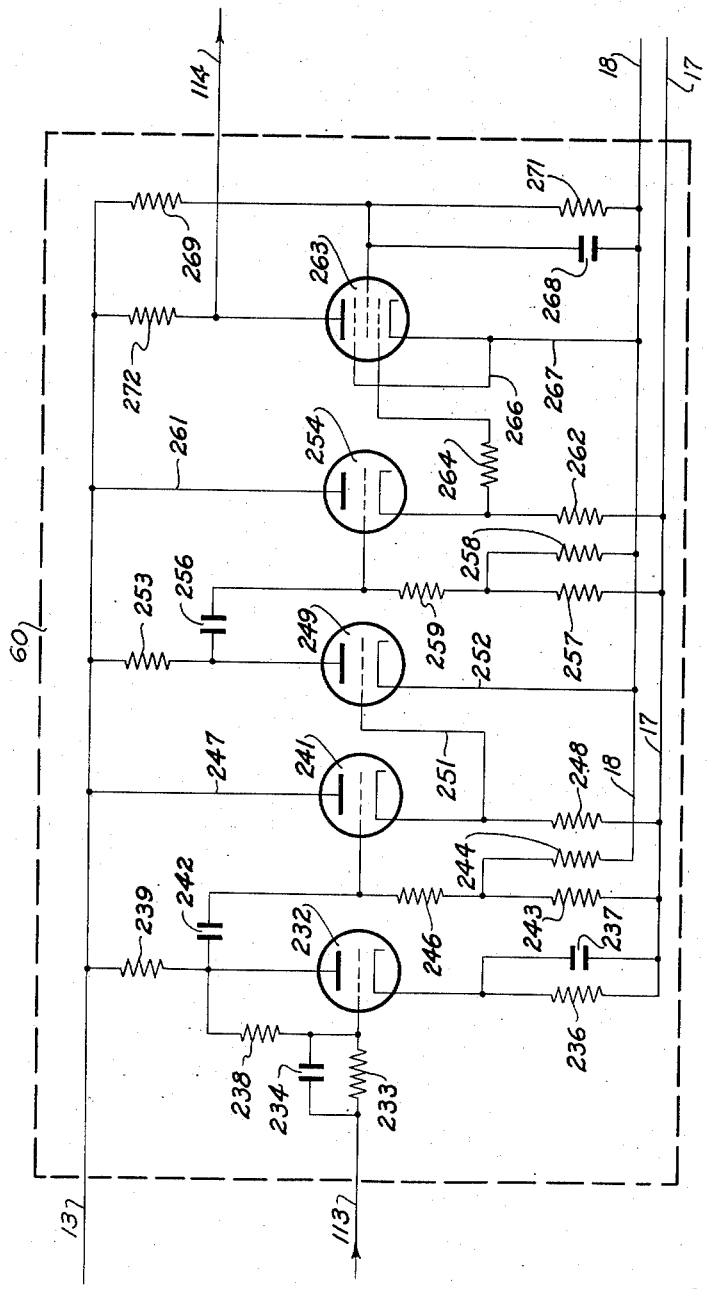
Fig_6

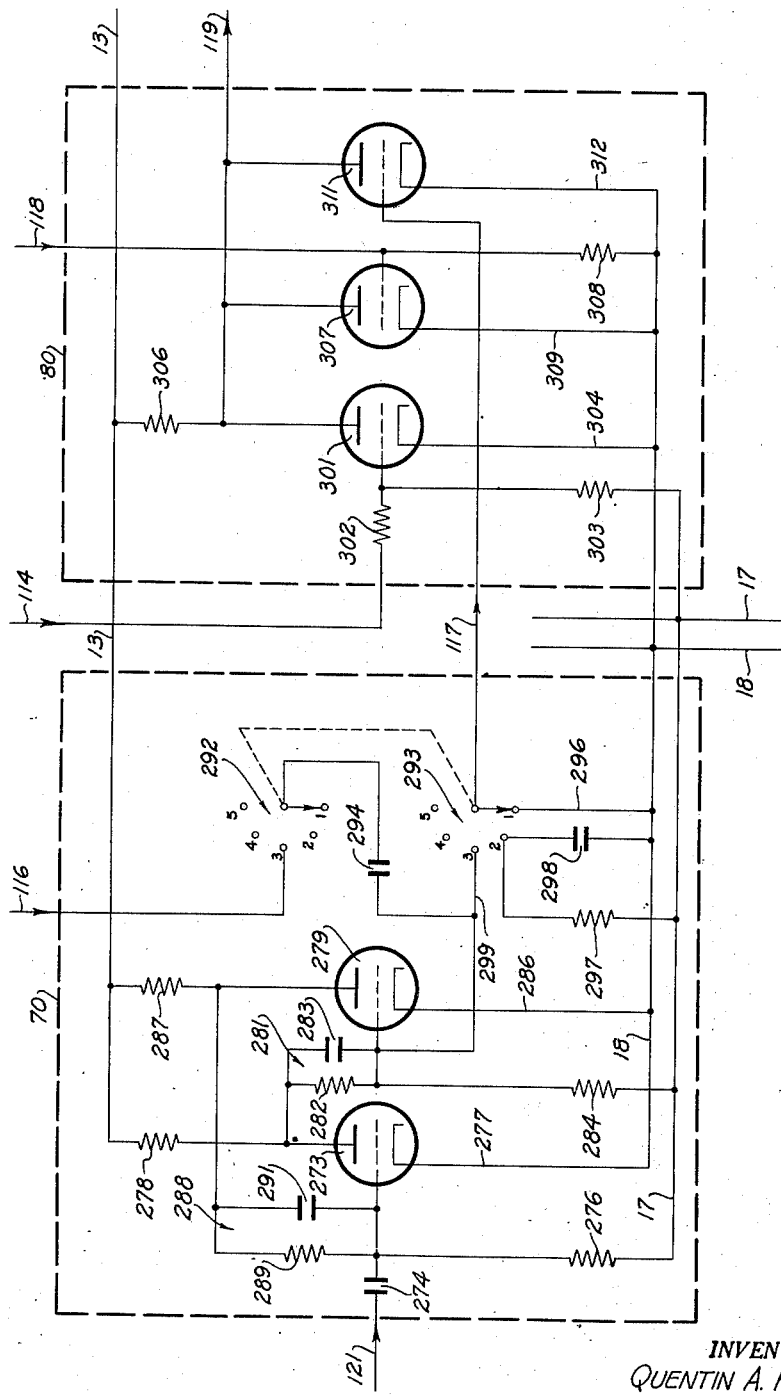

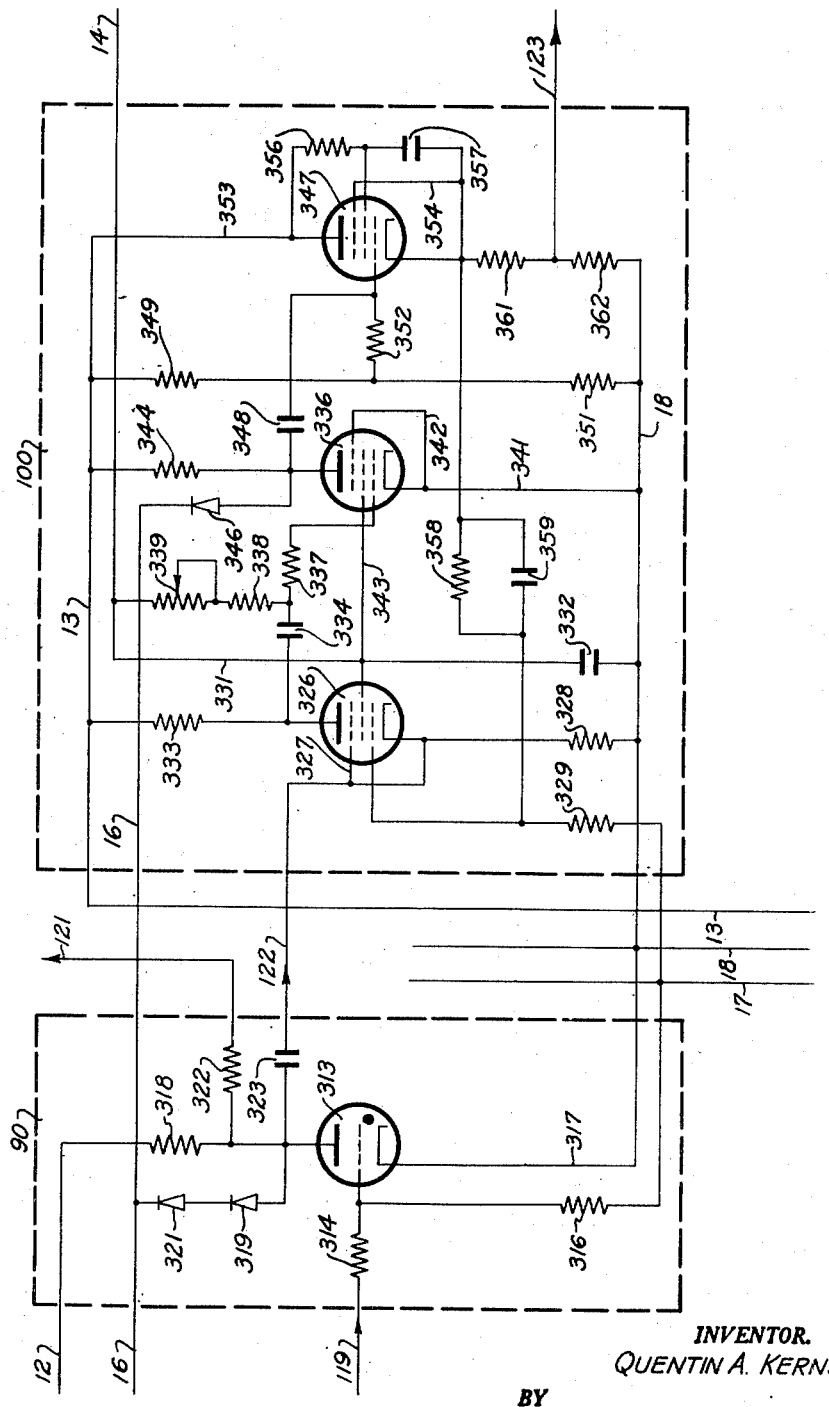
Aug. 8, 1950  Q. A. KERNS  2,517,676
PULSE-FORMING PREAMPLIFIER
Filed April 5, 1948  8 Sheets-Sheet 8
Fig_8_
INVENTOR.
QUENTIN A. KERNS
BY
ATTORNEY Patented Aug. 8, 1950

2,517,676

UNITED STATES PATENT OFFICE 2,517,676

PULSE-FORMING PREAMPLIFIER

Quentin A. Kerns, Berkeley, Calif., assignor to the United States of America as represented by the United States Atomic Energy Commission Application April 5, 1948, Serial No. 18,927

8 Claims. (Cl. 250—27)

1

This invention relates to an electronic control circuit and more particularly to method and apparatus for the control of frequency modulated systems.

In the operation of a frequency modulated circuit, it is often desirable to control the output of the circuit in response to a selected frequency. The present invention accomplishes this control by utilizing a combination of several circuits to transform a frequency modulated signal voltage into a rectangular voltage pulse of variable duration occurring at a predetermined rate in response to a selected frequency within the frequency range of the frequency modulated signal voltage.

It is therefore an object of the invention to provide a new and improved method and apparatus for the electronic control of a frequency modulated circuit.

Another object of the invention is to provide a circuit which will generate a voltage of variable duration at a predetermind rate.

Still another object of the invention is to provide a circuit which will generate a voltage of variable duration at a predetermined rate in response to a selected frequency within the range of frequency of a frequency modulated signal.

A still further object of the invention is to provide an electronic control circuit having a pulse selector circuit whereby the frequency of the output voltage can be varied as desired.

Other objects and advantages of the invention will be apparent in the following description and claims considered together with the accompanying drawings in which:

Fig. 6 is a schematic wiring diagram of the differentiator and amplifier circuit;

Fig. 7 is a schematic wiring diagram of the pulse type selector and gate circuits; and Fig. 8 is a schematic wiring diagram of the trigger and one-shot multivibrator circuits.

Figure 1:
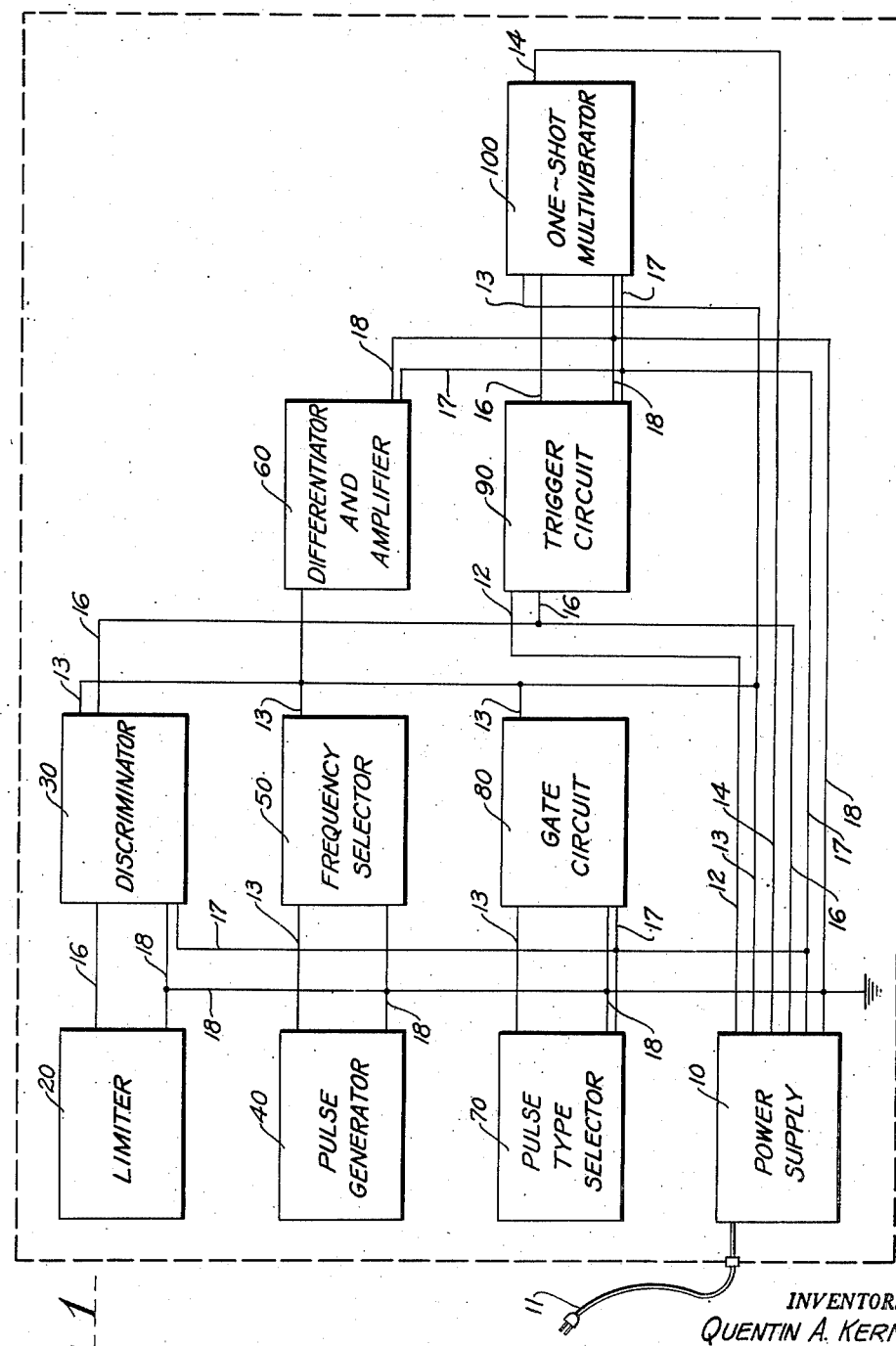
Figure 1 is a block diagram showing the power distribution from the power supply to the various circuits of the invention.

Referring to the drawings in detail, there is

2 shown in Fig. 1 a power supply 10 which has an external connection 11 to a standard alternating current source. The power supply 10 furnishes unidirectional operating voltages 12, 13, 14, 16, 17 and a common ground connection 18. The voltages 12, 13, 14, and 16 are positive and the values of these voltages decrease from the highest voltage 12 to the lowest voltage 16. The voltage 17 is negative in value. Also shown in Fig. 1 are blocks representing the circuits of the invention; namely, a limiter circuit 20, a discriminator circuit 30, a pulse generator circuit 40, a frequency selector circuit 50, a differentiator and amplifier circuit 60, a pulse type selector circuit 70, a gate circuit 80, a trigger circuit 90, and a one-shot multivibrator circuit 100. The distribution of the voltages supplied by the power supply 10 to the various circuits of the invention is shown schematically. A detailed discussion of the connections to the voltages will be given in the description of the circuits hereinbelow.

Figure 2:
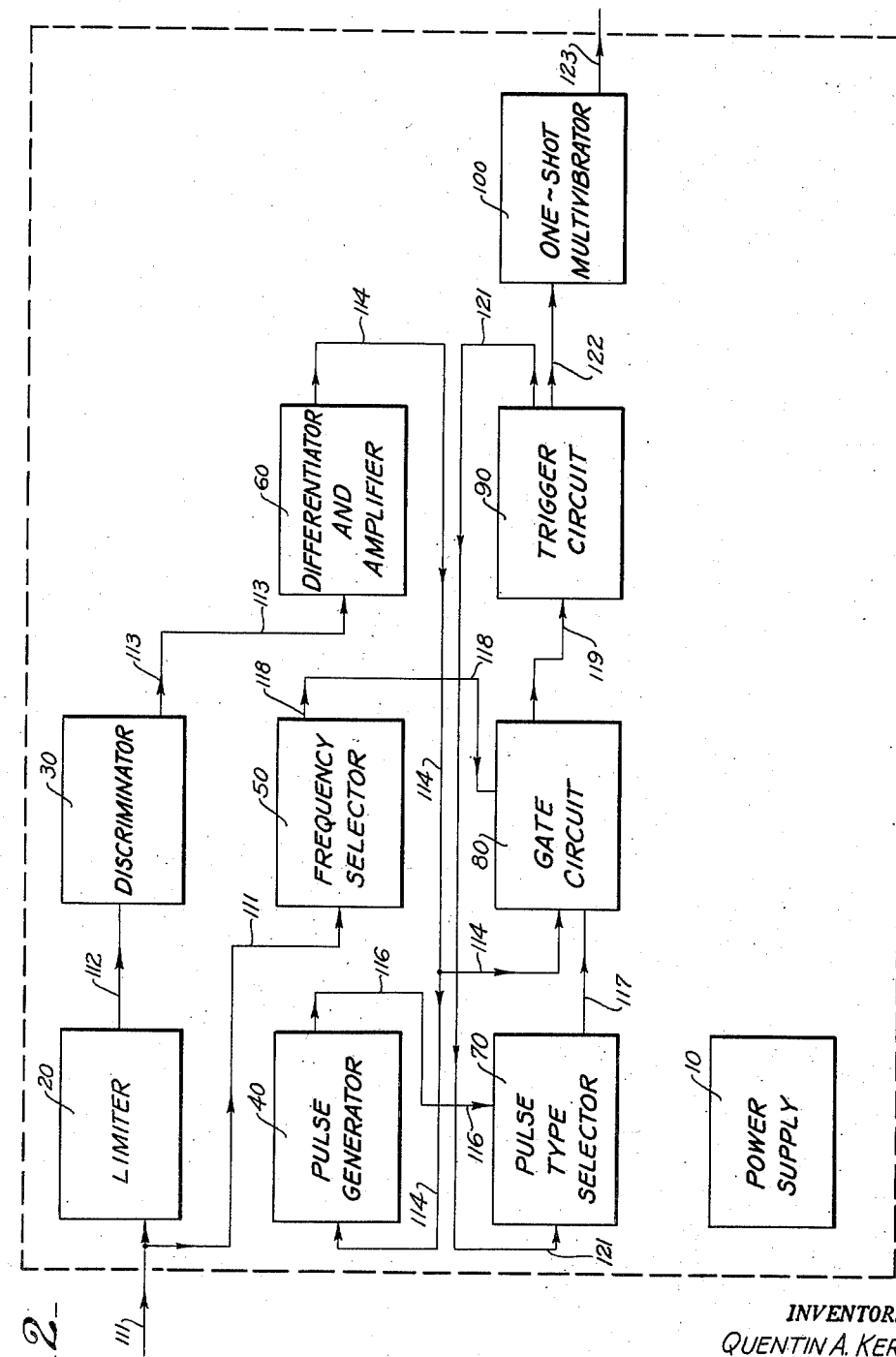
Fig. 2 is a block diagram showing the manner in which signal voltages are interconnected between the various circuits of the invention.

Fig. 2 shows the circuits in block form as in Fig. 1 and shows the signal voltage connections between the circuits. An input lead 111 is connected from an external frequency modulated system to the limiter circuit 20 and to the frequency selector circuit 50. An output lead 112 of the limiter circuit 20 is connected to the discriminator circuit 30. An output lead 113 of the discriminator circuit 30 is connected to the differentiator and amplifier circuit 60. A connecting lead 114 is connected from the output of the differentiator and amplifier circuit 60 to the pulse generator circuit 40 and to the gate circuit 80. The output of the pulse generator circuit 40 is connected to the pulse type selector circuit 70 by a lead 116. A lead 117 connects the pulse type selector circuit 70 to the gate circuit 80. The gate circuit 80 is connected to the frequency selector 50 by a lead 118 and is connected to the trigger circuit 90 by a lead 119. A connection is made from the trigger circuit 90 to the pulse type selector 70 by a lead 121 and to the one-shot multivibrator circuit 100 by a lead 122. A lead 123 serves as the output terminal for the invention and is connected to the output of the one-shot multivibrator circuit 100.

Figure 3:
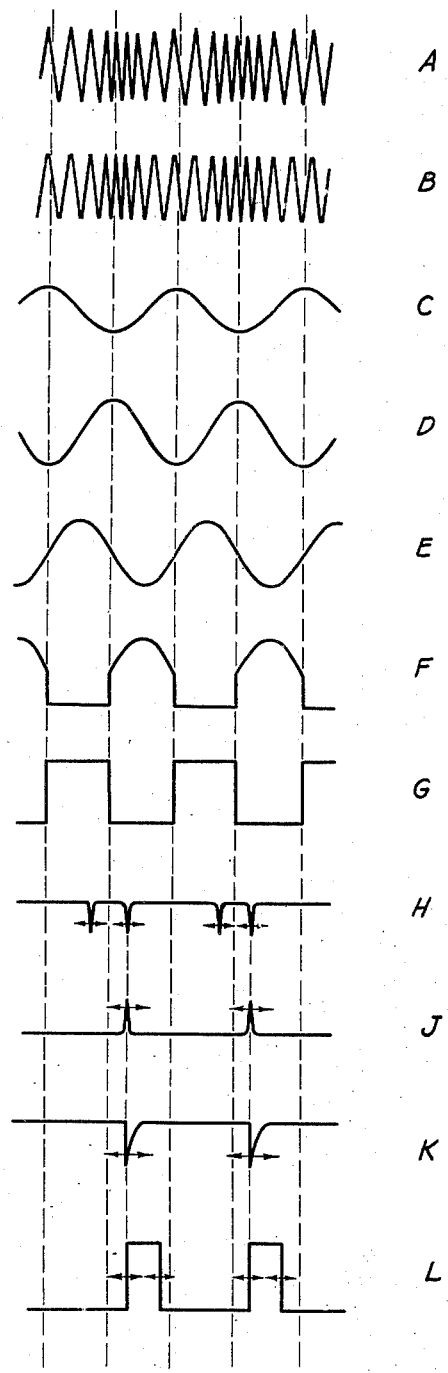
Fig. 3 shows the wave form of voltages at indicated positions in the various circuits of the invention.

Fig. 3 shows several time correlated voltage wave forms of voltages at various referenced positions throughout the circuits of the invention. Discussion of these voltages and their wave forms will be made in the descriptions of the circuits.

Figure 4:
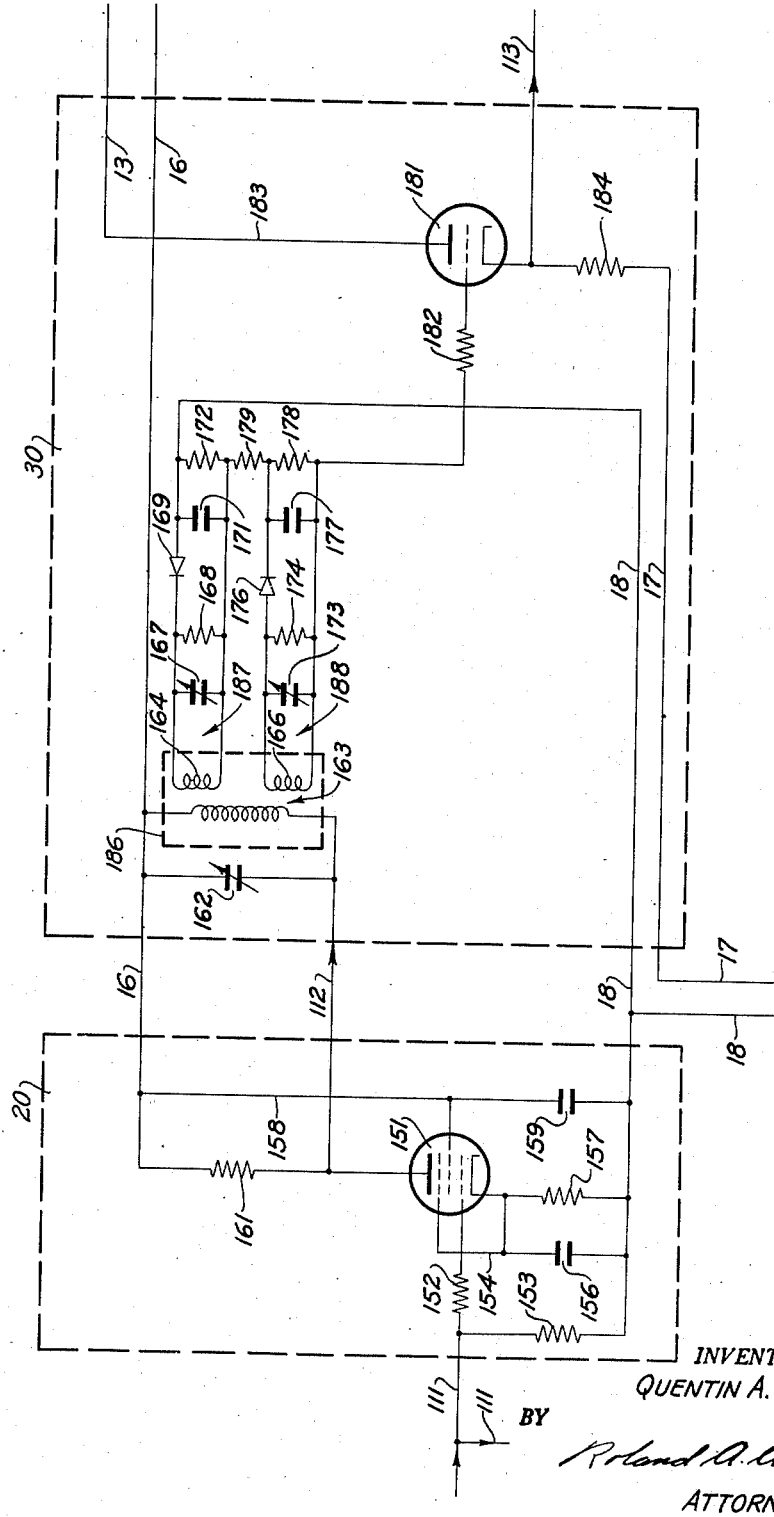
Fig. 4 is a schematic wiring diagram of the limiter and discriminator circuits.

In Fig. 4 the input lead 111 is shown connected to the control grid of a pentode type limiting tube 151 through a limiting resistor 152 and to the ground connection 18 through a grid biasing resistor 153. The cathode of this tube 151 is directly connected to the suppressor grid by a lead 154 and to the ground connection 18 through a parallel circuit comprising a by-pass condenser 156 and a cathode resistor 157. The screen grid of the tube 151 is directly connected to the positive voltage 16 by a lead 158 and to the ground connection 18 through a by-pass condenser 159. The anode of this tube 151 is connected to the positive voltage 16 through an anode resistor 161. The output lead 112 is connected to the anode of the tube 151 and serves as a point from which the output voltage of the limiter circuit 20 is taken.

Considering the operation of the limiter circuit 20, a frequency modulated signal as shown on Fig. 3—A is impressed at the cathode of the tube 151. The control grid voltage of the tube 151 follows the signal voltage until the control grid becomes positive with respect to the cathode of the tube, at which time grid current flows. The grid current produces a voltage drop across the limiting resistor 152 which opposes the signal voltage, thereby producing the limiting action, in that the positive peaks of the signal voltage above a predetermined value have no effect on the operation of the tube 151. Thus the anode voltage of the tube 151 is that shown on Fig. 3—B for the lead 112. The predetermined value of voltage at which the limiting action occurs can be set by the values of the resistors 152 and 157 and the condenser 156.

Also shown on Fig. 4 is the discriminator circuit 30 which derives its signal voltage from the lead 112. The lead 112 is connected to one side of a tuned circuit comprising a variable condenser 162 and the primary winding of a transformer 163. The other side of this tuned circuit is connected to the positive voltage 16. The transformer 163 has two secondary windings 164 and 166. One terminal of the secondary winding 164 is connected to one side of a variable condenser 167, a resistor 168 and a crystal rectifier 169, the latter of which is, in turn, connected to one side of a condenser 171 and a resistor 172, and to the ground connection 18. The other terminal of the secondary winding 164 is connected to the remaining side of the condenser 167, the resistor 168, the condenser 171, and the resistor 172. One terminal of the secondary winding 166 is connected to one side of a variable condenser 173, a resistor 174, and a crystal rectifier 176, the latter of which is, in turn, connected to one side of a condenser 177, a resistor 178, and to the ungrounded side of the resistor 172 through a resistor 179. The other terminal of the secondary winding 166 is connected to the remaining side of the condenser 173, the resistor 174, the condenser 177, the resistor 178, and is further connected to the control grid of a triode type cathode follower tube 181 through a resistor 182. The anode of the tube 181 is directly connected to the positive voltage 13 by a lead 183. The cathode of the tube 181 is connected to the negative voltage 17 through a cathode resistor 184. A lead 113 is also connected to the cathode of the tube 181 and serves as a source of output voltage for the discriminator circuit 30.

In operation, the lead 112 supplies a voltage as shown on Fig. 3—B to the primary winding of the transformer 163. The primary winding of the transformer 163 and the condenser 162 form a tuned circuit 186 which is tuned to a resonant frequency, which is the mean frequency of the frequency modulated signal voltage, by the adjustment of the variable condenser 162. The secondary winding 164 and the condenser 167 form a second tuned circuit 187 which is tuned to a resonant frequency slightly above the mean frequency of the signal voltage by the adjustment of the variable condenser 167. The secondary winding 166 and the condenser 173 form a third tuned circuit 188 which is tuned to a resonant frequency slightly below the mean frequency of the signal voltage by the adjustment of the variable condenser 173. The resistors 161, 168, and 174 lower the Q of the transformer windings sufficiently that a band-pass frequency response is obtained. Now, assume that the frequency modulated signal voltage has reached its maximum frequency. Under this condition the resonant frequency of the tuned circuit 187 differs from the frequency of the signal voltage by a minimum amount and a maximum value of current flows in the tuned circuit 187. At the same time, the resonant frequency of the tuned circuit 188 differs from the frequency of the signal voltage by a maximum amount and a minimum value of current flows in the tuned circuit 188. With a maximum value of current flowing in the tuned circuit 187, a maximum value of voltage is developed across the resistor 168. The voltage across the resistor 168 is then rectified by the crystal rectifier 169 and developed across the resistor 172. The connections of the discriminator circuit are such that the polarity of the voltage developed across the resistor 172 is negative at the ungrounded side. Now, as the frequency of the signal voltage decreases from its maximum value, the current flowing in the tuned circuit 187 decreases and the current flowing in the tuned circuit 188 increases. This action continues until frequency of the signal voltage reaches its minimum value, at which time a minimum value of current flows in the tuned circuit 187 and a maximum value of current flows in the tuned circuit 188. Under the latter condition a maximum value of voltage is developed across the resistor 178 having a polarity such that the side away from the ground connection 18 is positive. From the foregoing it is seen that a voltage is developed across the resistors 172, 179, and 178 which is negative by a maximum value at the highest frequency of the signal voltage, zero at the mean frequency of the signal voltage, and positive at the lowest frequency of the signal voltage. This alternating voltage is impressed on the control grid of the tube 181 which is connected as a cathode follower and serves to isolate the discriminator from the circuits which follow. The lead 113, which is connected to the cathode of the tube 181, furnishes an output voltage as shown on Fig. 3—C.

Figure 5:
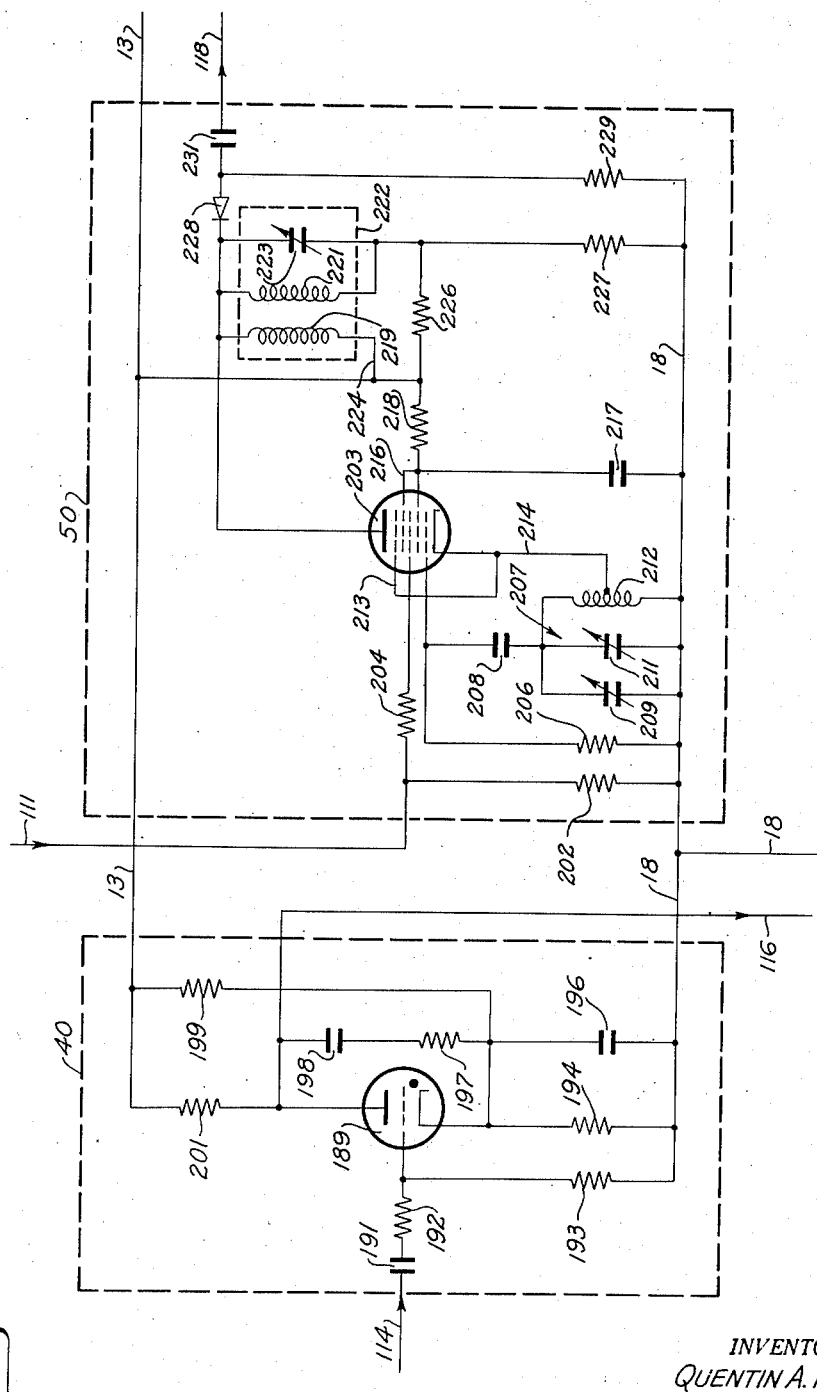
Fig. 5 is a schematic wiring diagram of the pulse generator and frequency selector circuits.

Referring now to Fig. 5, the lead 114 furnishes a voltage, as shown on Fig. 3—G, the development of which will be discussed hereinbelow with the description of the differentiator and amplifier circuit 60, to the pulse generator circuit 40. The voltage of the lead 114 is coupled to the control grid of a gas discharge type triode tube 189 through a series connected condenser 191 and resistor 192. The control grid of the tube 189 is connected to the ground connection 18 through a grid biasing resistor 193. A cathode resistor 194 is connected between the cathode of the tube 189 and the ground connection 18. A by-pass condenser 196 is connected in parallel with the resistor 194. The cathode of the tube 189 is connected to the anode through a series connected resistor 197 and condenser 198 and to the positive voltage 13 through a resistor 199. A dropping resistor 201 is connected between the positive voltage 13 and the anode of the tube 189. The output lead 116 of the pulse generator circuit 40 is connected to the anode of the tube 189.

In operation the pulse generator circuit 40 generates sawtooth voltages at a rate predetermined by the values of the anode resistor 201 and the condenser 198. This rate is usually set at a submultiple of the frequency of the frequency excursions of the frequency modulated signal voltage. The tube 189 and its associated elements constitute a free running relaxation oscillator; that is, the condenser 198 charges slowly through the resistor 201 until the firing voltage of the tube 189 is reached, at which time the tube conducts and the condenser 198 discharges. The cycle then repeats with the charging of the condenser 198. The square wave of voltage of the lead 114 as shown on Fig. 3—G is connected to the control grid of the tube 189 through a differentiator comprising the condenser 191 and the resistors 192 and 193. This results in a positive pulse of voltage being impressed on the control grid of the tube 189 at the time the square wave of voltage becomes positive and a negative pulse at the time the square wave of voltage becomes negative. These pulses of voltage have no effect on the operation of the tube 189 until a positive pulse occurs at a time when the condenser 198 has almost attained maximum charge. Under this condition the firing voltage of the tube 189 is lowered and the tube conducts, causing the frequency of the pulse generator to fall into synchronism with a submultiple of the frequency of the frequency excursions of the modulated signal voltage. Thus the output lead 116 of the pulse generator circuit 40 serves as a source of positive sawtooth voltages which are synchronized as explained above.

Also shown on Fig. 5 is the frequency selector circuit 50 which is supplied the voltage of Fig. 3—A by the lead 111. This lead 111 is connected to the ground connection 18 through a resistor 202 and to the third grid of a multigrid converter tube 203 through a grid current limiting resistor 204. The first grid of the tube 203 is connected to the ground connection 18 through a grid biasing resistor 206 and to a tuned circuit 207 through a coupling condenser 208. The tuned circuit 207 comprises the parallel connected condensers 209 and 211, and a coil 212. One side of the tuned circuit 207 is connected to the condenser 208 and the remaining side is connected to the ground connection 18. The cathode of the tube 203 is connected to the fifth grid of the tube by a lead 213 and to a tap on the coil 212 by a lead 214. The second and fourth grids of the tube 203 are connected by a lead 216 which is connected to the ground connection 18 through a condenser 217 and to the positive voltage 13 through a resistor 218. The anode of the tube 203 is connected to one end of both of the two windings 219 and 221 of a band-pass transformer 222 and to one side of a variable condenser 223 which is connected in parallel with the winding 221. The other end of the winding 219 is connected to the positive voltage 13 by a lead 224. The other end of the winding 221 is connected to the junction of two resistors 226 and 227 which are connected between the positive voltage 13 and the ground connection 18. The junction between the anode of the tube 203 and the condenser 223 is connected to a crystal rectifier 228 which, in turn, is connected to the ground connection through a resistor 229 and to the lead 118 through a coupling condenser 231.

In operation the lead 111 furnishes a voltage as shown on Fig. 3—A to the third grid of the converter tube 203 of the frequency selector circuit 50. The tube 203 is so connected that the elements connected into the circuit of the first grid form a local oscillator which oscillates at a frequency determined by the value of capacitance of the condensers 209 and 211 and the value of the inductance of the coil 212. The condenser 209 serves as a means for coarse adjustment and the condenser 211 for fine adjustment of the frequency of the oscillatory circuit. The band-pass transformer in the anode circuit of the tube is adjustable by means of the condenser 223. Now, with the condensers 209 and 211 so adjusted that the oscillator frequency is higher than the maximum frequency of the signal voltage of the lead 111, a voltage is impressed on the winding 219 which has a frequency equal to the sum of the two frequencies and a frequency equal to the difference of the two frequencies. From the foregoing it is seen that by adjusting the variable condenser 223 it is possible to obtain an output voltage from the band-pass transformer 222 at any desired frequency. Thus, if it is desired to obtain an output pulse of voltage at 10 megacycles when the frequency excursion of the signal voltage ranges from 9 to 13 megacycles, the condensers 209 and 211 should be adjusted for a local oscillator frequency of 14 megacycles, and the condenser 223 adjusted for passing voltages having a frequency of 4 megacycles. Under these conditions a short pulse of voltage will be impressed at the crystal rectifier 228 twice during each frequency excursion of the frequency modulated signal voltage, once as the frequency is increasing and once as the frequency is decreasing. The crystal rectifier 228 is so connected that the positive portion of the pulses are removed, thereby developing negative pulses of voltage across the resistor 229, which are coupled to the lead 118 by the condenser 231. The voltage of the lead 118 is as shown on Fig. 3—H.

Consider now Fig. 6 which shows the lead 113 connected to the control grid of a triode type tube 232 through a coupling network comprising a resistor 233 and a condenser 234. The cathode of the tube 232 is connected to the negative voltage 17 through a biasing resistor 236 and a by-pass condenser 237. A resistor 238 connects the anode to the control grid of the tube 232. The anode of the tube 232 is further connected to the positive voltage 13 through a dropping resistor 239 and to the control grid of a triode tube 241 through a coupling condenser 242. The control grid of the tube 241 is connected to the junction of the two resistors 243 and 244, which are connected between the negative voltage 17 and the ground connection 18, through a resistor 246. Other connections of the tube 241 are as follows: the anode is directly connected to the positive voltage 13 by a lead 247, and the cathode is connected to the negative voltage 17 through a biasing resistor 248 and to the control grid of a triode tube 249 by lead 251. The cathode of the tube 249 is directly connected to the ground connection 18 by a lead 252. The anode of the tube 249 is connected to the positive voltage 13 through a dropping resistor 253 and to the control grid of a triode tube 254 through a coupling condenser 256.

The control grid of the tube 254 is connected to the junction of two resistors 257 and 258, which are connected between the negative voltage 17 and the ground connection 18, through a resistor 259. Further connections of the tube 254 are as follows: the anode is directly connected to the positive voltage 13 by a lead 261, and the cathode is connected to the negative voltage 17 through a resistor 262 and to the control grid of a pentode tube 263 through a resistor 264. The tube 263 is further connected in the following manner: the cathode is connected to the suppressor grid by a lead 266 and to the ground connection 18 by a lead 267, the screen grid is connected to the ground connection 18 through a by-pass condenser 268 and to the junction of two resistors 269 and 271 of a voltage divider between the positive voltage 13 and the ground connection 18, and the anode is connected to the positive voltage 13 through a dropping resistor 272 and to the lead 114.

In operation, the lead 113 supplies the differentiator and amplifier circuit 60 with a voltage as shown on Fig. 3—C. The amplifier tube 232 and its associated elements are connected in such a manner that the voltage of the lead 113 is inverted and amplified at the anode of the tube. The voltage at the anode of the tube 232 is shown on Fig. 3—D and is impressed on the differentiator circuit comprising the condenser 242 and the resistors 246, 243, and 244, the values of which are such that the phase of the voltage is shifted by 90 degrees as shown on Fig. 3—E. Thus the point of zero amplitude of the alternating voltage corresponds to the point of maximum frequency of the frequency modulated signal voltage. The output voltage of the differentiator circuit is impressed on the control grid of the cathode follower tube 241 which drives the plate loaded amplifier tube 249. The tube 249 is supplied operating voltages by the connections described above, such that the control grid becomes sufficiently positive during the positive portion of the alternating voltage to overdrive the tube. The effect of this is to produce a voltage at the anode of the tube 249 such as is shown on Fig. 3—F, which is impressed on the control grid of the cathode follower tube 254. Since the tube 254 is a cathode follower, the control grid of the amplifier tube 263 is driven by a voltage substantially the same as that of Fig. 3—F. This tube 263 is supplied operating voltages which cause the tube to be overdriven during the most positive portion of the voltage impressed at its control grid and a clipping action takes place during this portion of the voltage cycle. Therefore the voltage at the anode of the tube 263 is substantially a square wave as shown on Fig. 3—G. Since the output lead 114 is connected to the anode of the tube 263, its voltage is also that of Fig. 3—G.

In Fig. 7 is shown the lead 121 which is connected to the control grid of a triode tube 273 through a coupling condenser 274 in the pulse tube selector circuit 70. The control grid of the tube 273 is connected to the negative voltage 17 through a biasing resistor 276. Other connections of the tube 273 are as follows: the cathode is directly connected to the ground connection 18 by a lead 277, and the anode is connected to the positive voltage 13 through a dropping resistor 278 and further to the control grid of a triode tube 279 through a coupling network 281 comprising a parallel connected resistor 282 and condenser 283. The control grid of the tube 279 is connected to the negative voltage 17 through a biasing resistor 284. Further connections to the tube 279 are as follows: the cathode is directly connected to the ground connection 18 by a lead 286, and the anode is connected to the positive voltage 13 through a dropping resistor 287 and to the control grid of the tube 273 through a coupling network 288 comprising a parallel connected resistor 289 and condenser 291. Also shown as part of the pulse selector circuit 70 are two ganged selector switches 292 and 293. Each switch has five positions with a contacting arm operating from a central position. Position No. 3 of the selector switch 292 is the only position to which a connection is made and this connection is the lead 116. The contacting arm of the switch 292 is connected to the control grid of the tube 279 through a coupling condenser 294. Position No. 1 of the switch 293 is directly connected to the ground connection 18 by a lead 296, position No. 2 is connected to the negative voltage 17 through a resistor 297 and to the ground connection 18 through a by-pass condenser 298, and position No. 3 is directly connected to the control grid of the tube 279 by a lead 299. The contacting arm of the switch 293 is connected to the lead 117 which serves as a source of output voltage for the pulse selector circuit 70.

The tubes 273 and 279 and their associated elements of the pulse type selector circuit 70 are interconnected in the form of an electronic switch or better known as a flip-flop circuit. The tube 279 is normally conducting and the tube 273 is normally nonconducting. The action of the flip-flop circuit is conventional in that a negative voltage impressed at the control grid of the tube 279 causes this tube to become nonconducting and the tube 273 to become conducting. To return the circuit to its normal operating condition, it is then necessary to impress a negative voltage at the control grid of the tube 273. Control of the output voltage of the entire circuit of the invention is obtained by the various settings of the selector switches 292 and 293. With the switches 292 and 293 set at position No. 1 the circuit is "off" and there is no output voltage, as will be explained more fully hereinafter. With the switches 292 and 293 in position No. 2, the voltage of the lead 117 becomes negative through the resistor 297 and condenser 298 combination, and the effects of this will be explained more fully hereinbelow. Now, with the switches 292 and 293 in position No. 3, the flip-flop circuit of the pulse type selector circuit 70 becomes effective, in that the lead 116 is connected to the control grid of the tube 279 through the switch 292 and the condenser 294, and the control grid of the tube 279 is connected to the lead 117 through the switch 293. Under this condition, the tube 279 is conducting, thereby placing a positive voltage on the control grid of the tube 279 and on the lead 117. Since the condenser 294 and the resistor 284 form a differentiator circuit, a negative pulse of voltage is impressed on the control grid of the tube 279 at the end of each sawtooth voltage of the lead 116, thereby causing the tube 279 to become nonconducting and the tube 273 to become conducting. Thus the lead 117 carries a negative voltage during the time the tube 273 is conducting. This condition remains until a negative voltage is impressed on the control grid of the tube 273 by the lead 121, which then returns the flip-flop circuit to normal and the voltage of the lead 117 to a positive value.

Also shown on Fig. 7 is the gate circuit 80, which shows the lead 114 connected to the control grid of a triode tube 301 through a grid limiting resistor 302. The control grid of the tube 301 is connected to the negative voltage 17 through a biasing resistor 303. The cathode of the tube 301 is directly connected to the ground connection 18 by a lead 304. A dropping resistor 306 is connected between the positive voltage 13 and the anode of the tube 301. A further connection of the anode of the tube 301 is made to the anode of a triode tube 307. The lead 118 is connected to the control grid of the tube 307 which is connected to the ground connection 18 through a biasing resistor 308. The cathode of the tube 307 is directly connected to the ground connection 18 by a lead 309. The anode of the tube 307 is further connected to the anode of a triode tube 311 and to the lead 119. The cathode of the tube 311 is directly connected to the ground connection 18 by a lead 312. The lead 117 is connected to the control grid of the tube 311.

The operation of the gate circuit 80 is controlled by the selector switches 292 and 293 of the pulse type selector circuit 70. With the switches 292 and 293 in position No. 1, the control grid of the tube 311 is held at ground potential by the lead 117. Since the anode of tube 311 is positive, the tube conducts thereby holding the output voltage at the lead 119 at a minimum value. With the switches 292 and 293 in position No. 2, the negative voltage of the lead 117 holds the tube 311 in a nonconducting state and any voltages generated in the anode circuit of the tubes 301 and 307 appear at the lead 119. While the tube 311 is nonconducting, the voltages impressed at the control grids of the tubes 301 and 307, by the leads 114 and 118 respectively, control the output voltage. During the positive portion of the voltage of the lead 114, which is shown on Fig. 3—G, the tubes 301 and 307 are both conducting heavily, thereby causing the anode voltage of the tubes to be at a minimum value. Under this condition, any negative voltage impressed at the control grid of the tube 307 by the lead 118 causes the tube to cease conducting for the duration of the negative voltage; however, since the tube 301 is conducting heavily, the change in the anode voltage of the tubes is very slight. Therefore the negative pulse in the voltage of the lead 118, which is shown on Fig. 3—H, occurring during the time the frequency of the voltage of the frequency modulated signal voltage is increasing, is successfully swamped out. When the negative portion of the voltage of the lead 114 is impressed on the control grid of the tube 301, this tube becomes nonconducting. Now, when a negative voltage is impressed at the control grid of the tube 307 by the lead 118, the tube 307 becomes non-conducting and the anode voltage then increases very rapidly and remains positive for the duration of the negative voltage at the control grid. Since a negative pulse of voltage is impressed at the control grid of the tube 307 by the lead 118, the anode voltage and therefore the voltage of the lead 119 is a sharp positive pulse of voltage, as shown on Fig. 3—J, occurring once during the descending frequency of the frequency modulated signal voltage. With the switches 292 and 293 in position No. 3, the tube 311 is conducting because the control grid of the tube is positive, and thereby maintaining the gate circuit 80 closed. When a sawtooth voltage is generated by the pulse generator circuit 40, the flip-flop circuit of the pulse type selector circuit 70 operates to place a negative voltage at the control grid of the tube 311, which opens the gate circuit. This condition remains until a negative pulse of voltage causes the tube 307 to become nonconducting while the tube 301 is maintained negative by the negative portion of the voltage of the lead 114. At this time a positive pulse of voltage is developed at the anodes of the tubes 301, 307, and 311 which appears at the lead 119. Shortly after the development of this positive pulse of voltage at the lead 119, the voltage of the lead 121 causes the flip-flop circuit of the pulse type selector circuit 70 to operate and close the gate circuit 80. This procedure is then repeated at the rate of the frequency of the output voltage of the pulse generator 40.

Referring to Fig. 8, the lead 119 is connected to the control grid of a gas discharge tube 313 through a grid limiting resistor 314 in the trigger circuit 90. The control grid of the tube 313 is connected to the negative voltage 17 through a biasing resistor 316. Other connections of the tube 313 are as follows: the cathode is directly connected to the ground connection 18 by a lead 317, and the anode is connected to the positive voltage 12 through a resistor 318 and to the positive voltage 16 through a pair of crystal rectifiers 319 and 321. The anode of the tube 313 is further connected to the lead 121 through a resistor 322 and to the lead 122 through a condenser 323.

The lead 119 furnishes positive pulses of voltage to the trigger circuit 90 as described above. The operating voltages supplied to the tube 313 are such that the tube conducts only during the time of the positive pulses of voltage which are impressed by the lead 119 on the control grid of the tube. The crystals 319 and 321 are so connected that the condenser 323 is charged to a constant value during the time the tube 313 is nonconducting and thereby forms a uniform pulse of voltage when the tube 313 conducts and discharges the condenser. The negative pulse of voltage is developed at the anode of the tube 313 and appears at the leads 121 and 122. The voltage of the leads 121 and 122 is shown on Fig. 3—K.

Also shown on Fig. 8 is the one-shot multivibrator circuit 100, wherein the lead 122 is connected to the cathode of a pentode tube 326. The cathode of the tube 326 is further connected to the suppressor grid by a lead 327 and to the ground connection 18 through a resistor 328. Other connections of the tube 326 are as follows: the control grid is connected to the negative voltage 17 through a biasing resistor 329, the screen grid is connected directly to the positive voltage 14 by a lead 331 and to the ground connection 18 through a by-pass condenser 332, and the anode is connected to the positive voltage 13 through a dropping resistor 333. The anode of the tube 326 is connected to a coupling condenser 334 which, in turn, is connected to the control grid of a pentode tube 336 through a grid limiting resistor 337 and to the positive voltage 14 through a series connected resistor 338 and potentiometer 339. The cathode of the tube 336 is connected to the ground connection 18 by a lead 341 and to the suppressor grid by a lead 342. Further connections of the tube 336 are as follows: the screen grid is connected to the screen grid of the tube 326 by a lead 343 and the anode is connected to the positive voltage 13 through a dropping resistor 344. The anode of the tube 336 is further connected to the positive voltage 16 through a crystal 346 and to the control grid of a pentode tube 347 through a coupling condenser 348. The control grid of the tube 347 is also connected to the junction of two resistors 349 and 351, which are serially connected between the positive voltage 13 and the ground connection 18 through a resistor 352. Further connections of the tube 347 are as follows: the anode is connected to the positive voltage 13 by a lead 353, the suppressor grid is connected to the cathode by a lead 354, the screen grid is connected to the anode through a dropping resistor 356 and to the cathode through a condenser 357, and the cathode is connected to the control grid of the tube 326 through a parallel connected resistor 358 and condenser 359 and further to the ground connection 18 through two series connected resistors 361 and 362. The junction of the two resistors 361 and 362 is connected to the lead 123.

In operation the one-shot multivibrator circuit 100 transforms a negative pulse of voltage impressed by the lead 122 into a positive rectangular pulse of voltage of variable duration at the lead 123, as shown on Fig. 3—L. In detail, the negative pulse of voltage of the lead 122 is impressed on the cathode and suppressor grid of the tube 326, which is normally nonconducting because the control grid has a negative bias voltage. The tube 326 then conducts and so charges the condenser 334 that the control grid of the tube 336 holds the tube nonconductive until the charge leaks off through the resistors 333 and 338, and the potentiometer 339. The discharge time of the condenser 334 is controllable by the potentiometer 339. During the time the tube 336 is held in a nonconducting state, the anode voltage of the tube increases, thus forming a positive rectangular pulse of voltage, the duration of which is variable by the potentiometer 339. The crystal 346 holds the maximum value of the voltage pulse at a constant predetermined value so that the output pulses are uniform. The voltage at the anode of the tube 336 is coupled to the control grid of the tube 347 which is connected in the form of a cathode follower. A feedback circuit comprising the resistor 358 and the condenser 359 is connected between the cathode of the tube 347 and the control grid of the tube 326 to improve the wave shape and response of the one-shot multivibrator circuit 100. The rectangular pulse of voltage taken from the cathode of the tube 347 by the lead 123 serves as the output for the invention and is shown on Fig. 3—L.

Consider now, the operation of the invention as a unit rather than as individual circuits as described above. With the power supply 10 energized, the necessary operating voltages are supplied to the individual circuits as shown on Fig. 1, and with the lead 111 connected to a frequency modulated system to be controlled, a frequency modulated signal voltage as shown on Fig. 3—A is impressed on the limiter circuit 20 and the frequency selector circuit 50. This frequency selector circuit 50 comprises the local oscillator and mixer tube 203 and the tuned anode circuit which can be tuned by the condenser 223 to pass a signal voltage at a predetermined frequency. The local oscillator frequency is adjustable by the coarse and fine tuning condensers 209 and 211 to permit adjustment of the instantaneous frequency at which the heterodyne signal is obtained. Thus, for each excursion of the frequency modulated signal voltage, two output signal voltages are generated, one as the frequency is ascending and the other as the frequency is descending. These signal voltages are rectified by the crystal 228 to develop two short negative pulses of voltage at the lead 118 as shown on Fig. 3—H. With the tuned circuit in the anode circuit of the tube 203, adjusted to pass a selected difference frequency between the local oscillator frequency and the frequency of the frequency modulated signal, the time at which the sharp negative pulses of voltage are developed at the lead 118 is adjustable by adjusting the frequency of the local oscillator with the condensers 209 and 211. By lowering the frequency of the local oscillator the first of the two output pulses of voltage can be made to occur early in the ascending frequency of the frequency modulated signal voltage and the second pulse of voltage late in the descending frequency. By raising the frequency of the local oscillator the first of the two output pulses of voltage can be made to occur late in the ascending frequency of the frequency modulated signal voltage and the second pulse of voltage early in the descending frequency.

The frequency modulated signal voltage of the lead 111 as shown on Fig. 1—A is also impressed on the limiter circuit 20 which comprises the tube 151 and operates to remove the amplitude modulation present on the signal voltage and further serves as an isolation stage between the lead 111 and the following discriminator circuit 30. The output voltage of the limiter circuit 20 is coupled from the anode of the tube 151 to the discriminator circuit 30 by the lead 112 and is shown on the Fig. 3—B.

Thus, the voltage of the lead 112 is impressed on the discriminator circuit 30, which comprises a transformer 163 having a tuned primary circuit and having two tuned secondary circuits, and a tube 181 connected as a cathode follower. The primary tuned circuit is tuned to the mean frequency of the frequency spread of the modulated signal voltage. One of the secondary circuits of the transformer 163 is tuned to resonate at a frequency slightly above the resonant frequency of the primary winding, while the other secondary circuit is tuned to resonate at a frequency slightly below that of the primary winding. The crystals 169 and 176 rectify the alternating output voltages of two secondary circuits so that a voltage is developed across the resistors 172, 173, and 178 which is proportional to the frequency of the modulated signal voltage. These resistors are so connected to the two secondary circuits of the transformer 163 and to the control grid of the cathode follower tube 181 that the control grid is driven negative at the highest frequency of the frequency modulated signal and positive at the lowest frequency. Since the voltage developed at the cathode of a cathode follower follows the voltage impressed at the control grid, the voltage of the lead 113, which is connected to the cathode of the tube 181, is substantially a sine wave having its minimum value coincident with the point of highest frequency of the frequency modulated signal. The voltage of the lead 113 is shown on Fig. 3—C and is coupled to the differentiator and amplifier circuit 60.

With the voltage of the lead 113 impressed on the control grid of the tube 232, which is connected in the form of a conventional amplifier, the voltage is amplified and inverted at the anode of the tube as shown on Fig. 3—D. Since the combination of the condenser 242 and resistors 246, 243, and 244 is a differentiator circuit through which a voltage impressed is shifted in phase by 90 degrees, the voltage of the control grid of the tube 241 is similar to the voltage of the anode of the tube 232 except for the 90 degree phase shift and is shown as Fig. 3—E. The tube 241 is connected as a cathode follower and couples the voltage output of the differentiator circuit to the control grid of the anode loaded amplifier tube 249. The positive portion of the voltage impressed on the control grid of the tube 249 overdrives the tube and the most positive portion of the voltage is thereby lost. Thus the anode voltage of the tube 249 has the wave shape as shown on Fig. 3—F. This voltage is coupled to the control grid of the tube 263 through the cathode follower tube 254. The tube 263 is overdriven during the positive half-cycle of the voltage impressed on its control grid thereby completing the transformation of the sinusoidal input voltage to a rectangular output voltage at the anode of the tube 263. Thus, the voltage of the lead 114 which is connected to the anode of the tube 263 is as shown on Fig. 3—G.

The voltage of the lead 114 is connected to the gate circuit 80 and to the pulse generator circuit 40. The latter circuit comprises a gas discharge tube 189 which is connected to oscillate at a rate predetermined by the values of the resistor 201 and the condenser 198. The output voltage of the pulse generator 40 is synchronized by the voltage of the lead 114 which is impressed on the control grid of the tube 189 through a differentiator circuit comprising the condenser 191 and the resistors 192 and 193. The positive pulses of voltage developed by the differentiator circuit at the control grid of the tube 189 force the conduction of the tube when a pulse of voltage occurs at a time shortly before the condenser 198 has reached full charge, thereby synchronizing the oscillator with the voltage output of the differentiator and amplifier circuit 60. The output voltage of the pulse generator circuit 40 is coupled to the pulse type selector circuit 70 by the lead 116.

The pulse type selector circuit 70 comprises a manual switching arrangement and an electronic switch for selecting the manner in which the output voltage of the control circuit is developed. The manual switching arrangement shown in Fig. 7 comprises two ganged five-position selector switches 292 and 293. In the particular embodiment of the invention shown, only three of the five available positions are utilized and will be discussed; however, it is to be noted that the remaining two positions could be utilized for methods of pulsing other than those disclosed. With the ganged switches 292 and 293 in position No. 1, the output voltage of the circuit is zero. With the ganged switches 292 and 293 in position No. 2, the output voltage of the circuit at the lead 123 is controlled in such a manner that a rectangular pulse of voltage is generated at the desired frequency during the descending frequency of the frequency modulated signal. A further discussion of the positions Nos. 1 and 2 of the switches 292 and 293 will be given along with the discussion of the gate circuit 80 hereinafter. With the switches 292 and 293 in position No. 3, the electronic switch comprising the two tubes 273 and 279 becomes operative to influence the output voltage of the lead 123. The lead 117 normally has a positive voltage during the time the switches 292 and 293 are in position No. 3; however, when a positive sawtooth pulse of voltage is impressed on the differentiator circuit comprising the condenser 294 and the resistor 284, the control grid of the tube 279 receives a negative pulse of voltage which causes the tube 279 to become nonconducting and the tube 273 to become conducting, thereby placing a negative voltage on the lead 117. A short time later a negative pulse of voltage is transmitted to the control grid of the tube 273 causing the tube 273 to become nonconducting and the tube 279 to become conducting, thus the normal operation of the electronic switch is restored and the voltage of the lead 117 is again positive. The electronic switch is then in position for another output pulse of voltage from the pulse generator circuit 40 and it is seen that for each pulse of voltage generated by the pulse generator circuit 40, the electronic switch is operated.

The pulse type selector circuit 70 controls the operation of the gate circuit 80 by the voltages transmitted between the two circuits by the lead 117. This control is maintained by controlling the operation of the tube 311 with the voltages of the lead 117. From the connections, previously described, it is seen that during the time the control grid of the tube 311 is positive and the tube is conducting, there can be no output voltage at the lead 119 as the tube effectively removes positive pulses of voltage at its anode. When the control grid of the tube 311 is maintained negative by the voltage of the lead 117, the tube 311 is held in a nonconducting state and signal voltages appearing at the anode of the tube are then coupled to the trigger circuit 90 by the lead 119. The lead 114 furnishes a voltage as shown on Fig. 3—G to the control grid of the tube 301 and further controls the output voltage of the lead 119 by alternately making the tube 301 conducting and nonconducting. During the time the tube 301 is conducting, the voltages impressed at the control grid of the tube 307 have substantially no effect on the voltage of the lead 119 which is at a minimum value. However, when the tube 301 is nonconducting because of the negative voltage applied to its control grid by the lead 114, the negative pulse of voltage of the lead 118 causes the tube 307 to become nonconducting, thereby raising the anode voltage and developing a positive pulse of voltage at the lead 119. From the foregoing, it is seen: that a setting of the switches 292 and 293 of the pulse type selector circuit 70 in position No. 1 maintains the tube 311 conducting and therefore holds the voltage of the lead 119 at a minimum value, that a setting of the switches 292 and 293 in position No. 2 maintains the tube 311 in a nonconducting state and therefore allows a positive pulse of voltage to be developed at the lead 119 during the descending frequency of the frequency modulated signal as shown on Fig. 3—J, and that a setting of the switches 292 and 293 in position No. 3 causes the tube 311 to become nonconducting each time the pulse generator 40 develops a pulse of voltage at the lead 116 and therefore allows a pulse of voltage to be developed at the lead 119 at the predetermined rate of the pulse generator 40.

The positive pulses of voltage of the lead 119 are then impressed at the control grid of the tube 313 of the trigger circuit 90 which in turn generates a negative pulse of voltage at the leads 121 and 122 in response to each positive pulse of voltage of the lead 119. The negative pulse of voltage of the lead 121 is impressed at the control grid of the tube 273 of the pulse type selector circuit 70 to operate the electronic switch therein and return the switch to its normal operating condition after each positive pulse of voltage of the lead 116.

The one-shot multivibrator circuit 100 is controlled by the voltage of the lead 122 which is impressed at the cathode of the normally nonconducting tube 326. The tube 326 then conducts and the condenser 334 becomes charged in such a manner that the tube 336 is maintained nonconducting until the charge of the condenser leaks off through the resistors 333 and 338 and the potentiometer 339. By varying the effective resistance of the discharge path of the condenser 334 by changing the setting of the potentiometer 339, it is possible to change the time during which the tube 336 is maintained in a nonconducting state. The positive rectangular voltages developed at the anode of the tube 336 are then coupled to the control grid of the cathode follower tube 347, and the rectangular pulses of voltage developed at the cathode are then available to operate an external circuit by connecting the lead 123 thereto.

The particular embodiment of the invention described was developed for use with a frequency modulated cyclotron which it was desired to operate with a pulsed arc. This invention accomplished the desired result by supplying a variable rectangular pulse of voltage to the arc electrodes of the cyclotron at any selected frequency within the descending frequency interval of the frequency modulated voltage applied to the accelerating electrodes. Several different methods of pulsing are provided by the pulse type selector circuit 70 and several other methods could be provided by a few simple additional connections.

While the salient features of this invention have been described in detail with respect to one embodiment, it will, of course, be apparent that numerous modifications may be made within the spirit and scope of this invention, and it is therefore not desired to limit the invention to the exact details shown except insofar as they may be defined in the following claims.

What is claimed is:

1. In a control circuit for a frequency modulated system, the combination comprising means developing a voltage proportional to the frequency of the voltage of a frequency modulated system, means shifting the phase of said proportional voltage and shaping said shifted voltage into a rectangular voltage, means developing a pulse of voltage at a selected frequency within the range of the frequency of the voltage of said frequency modulated system, a gate circuit responsive to said rectangular voltage and said pulse of voltage and developing a pulse of voltage, and means responsive to the output pulse of voltage of said gate circuit generating a rectangular pulse of voltage once during the excursion of the frequency of the voltage of said frequency modulated system at said selected frequency.

2. In a control circuit for a frequency modulated system, the combination comprising means developing a voltage proportional to the frequency of the voltage of a frequency modulated system, means shifting the phase of said proportional voltage and shaping said shifted voltage into a rectangular voltage, means developing a pulse of voltage at a selected frequency within the range of the frequency of the voltage of said frequency modulated system, means generating a pulse of voltage at a predetermined frequency, a gate circuit responsive to said rectangular voltage, said pulse of voltage obtained at said selected frequency, and said generated pulses of voltage, and means responsive to the output voltage of said gate circuit generating rectangular pulses of voltage with said predetermined frequency at said selected frequency.

3. In a control circuit for a frequency modulated system, the combination comprising means developing a voltage proportional to the frequency of the voltage of a frequency modulated system, means shifting the phase of said proportional voltage and shaping said shifted voltage into a rectangular voltage, means developing a pulse of voltage at a selected frequency within the range of said frequency modulated system, means generating a pulse of voltage at a predetermined frequency, a gate circuit responsive to said rectangular voltage and said pulse of voltage occurring at said selected frequency, means controlling the operation of said gate circuit with said generated pulses of voltage, and means responsive to the output voltage of said gate circuit generating rectangular pulses of voltage at said selected frequency and having said predetermined frequency.

4. In a control circuit for a frequency modulated system, the combination comprising a discriminator developing a voltage proportional to the frequency of the voltage of a frequency modulated system, a differentiator and amplifier shifting the phase of said proportional voltage and shaping said shifted voltage into a rectangular voltage, a frequency selector developing a pulse of voltage at a selected frequency within the range of the frequency of the voltage of said frequency modulated system, a gate circuit developing a pulse of voltage in response to said rectangular voltage and said pulse of voltage, a trigger circuit generating a uniform pulse of voltage in response to the pulse of voltage developed by said gate circuit, and a one-shot multivibrator responsive to said uniform pulse of voltage whereby a rectangular pulse of voltage of variable duration is produced once during the excursion of the frequency of the voltage of said frequency modulated system at said selected frequency.

5. In a control circuit for a frequency modulated system, the combination comprising a discriminator developing a voltage proportional to the frequency of the voltage of a frequency modulated system, a differentiator and amplifier shifting the phase of said proportional voltage and shaping said shifted voltage into a rectangular voltage, a frequency selector producing a pulse of voltage at a selected frequency within the range of the frequency of the voltage of said frequency modulated system, an oscillator generating pulses of voltage at a predetermined rate which are synchronized with said rectangular voltage, a gate circuit responsive to said rectangular voltage, to said pulse of voltage produced at said selected frequency, and to the pulses of voltage generated by said oscillator producing a pulse of voltage, a trigger circuit developing a uniform pulse of voltage in response to the pulse of voltage produced by said gate circuit, and a one-shot multivibrator responsive to said uniform pulse of voltage whereby a rectangular pulse of voltage of variable duration occurs at said predetermined rate of said oscillator and coincident with said selected frequency.

6. The combination of claim 5 wherein the gate circuit comprises three triode vacuum tubes connected in parallel across a source of operating voltage, the control grid of the first of said triodes being negatively biased beyond cut-off and connected to the output of said amplifier, the control grid of the second of said triodes being positively biased and connected to the output of said frequency selector, and the control grid of the third of said triodes being positively biased and connected to said oscillator whereby an output pulse of voltage occurs only when said three tubes are each in a cut-off state.

7. The combination of claim 5 wherein the discriminator comprises a primary tuned circuit having resonance at the mean frequency of said frequency modulated system, a first secondary tuned circuit inductively coupled to said primary tuned circuit and having resonance above said mean frequency, a secondary tuned circuit inductively coupled to said primary tuned circuit and having resonance below said mean frequency, a rectifier connected to each of said secondary tuned circuits, and a resistance voltage divider network interconnecting said rectifiers and secondary tuned circuits whereby a voltage proportional to the frequency of said frequency modulated system is developed.

8. In a control circuit, the combination comprising a source of frequency modulated voltage, a discriminator connected to said source for developing a voltage proportional to the frequency of said modulated voltage, a differentiator connected to the output of said discriminator and having characteristics such that the phase of the voltage applied is shifted at the output, an amplifier connected to the output of said differentiator for shaping the shifted voltage into a rectangular voltage, a frequency selector circuit connected to said source for forming a pulse of voltage at a selected frequency, an oscillator connected to the output of said amplifier for generating pulses of voltage at a predetermined rate in response to said rectangular voltage, a gate circuit having three input circuits, one of said inputs being connected to said oscillator, the second input being connected to said frequency selector, and the third input being connected to said amplifier, whereby said gate circuit passes a pulse of voltage once during the frequency excursion of said modulated source voltage at said selected frequency.

QUENTIN A. KERNS.

REFERENCES CITED

The following references are of record in the file of this patent:

UNITED STATES PATENTS

| Number | Name | Date |
| --- | --- | --- |
| 2,243,234 | Von Duhn | May 27, 1941 |
| 2,368,953 | Walsh | Feb. 6, 1945 |
| 2,414,479 | Miller | Jan. 21, 1947 |
| 2,434,294 | Ginzton | Jan. 13, 1948 |